(12) United States Patent
Chapman

(10) Patent No.: US 9,080,869 B2
(45) Date of Patent: Jul. 14, 2015

(54) MAGNETIC COMPASS

(76) Inventor: Paul Chapman, Gladstone (AU)

( * ) Notice: Subject to any disclaimer, the term of this patent is extended or adjusted under 35 U.S.C. 154(b) by 160 days.

(21) Appl. No.: 13/698,474

(22) PCT Filed: May 16, 2011

(86) PCT No.: PCT/AU2011/000570
§ 371 (c)(1),
(2), (4) Date: Nov. 16, 2012

(87) PCT Pub. No.: WO2011/143696
PCT Pub. Date: Nov. 24, 2011

(65) Prior Publication Data
US 2014/0182149 A1    Jul. 3, 2014

(30) Foreign Application Priority Data
May 17, 2010   (AU) ................... 2010902089

(51) Int. Cl.
G01C 17/18   (2006.01)
G01C 17/14   (2006.01)

(52) U.S. Cl.
CPC ............... *G01C 17/18* (2013.01); *G01C 17/14* (2013.01)

(58) Field of Classification Search
CPC ......... G01C 17/04; G01C 17/08; G01C 17/20
USPC ................................ 33/355 R, 364
See application file for complete search history.

(56) References Cited

U.S. PATENT DOCUMENTS

| | | | |
|---|---|---|---|
| 3,956,831 A | | 5/1976 | Sibley |
| 4,930,224 A | * | 6/1990 | LeBlanc ......................... 33/364 |
| 6,430,825 B1 | * | 8/2002 | Baumann ..................... 33/355 R |
| 7,194,814 B2 | * | 3/2007 | Wilkinson et al. .......... 33/355 R |
| 2002/0104224 A1 | | 8/2002 | Barker |
| 2004/0045179 A1 | * | 3/2004 | Chang ......................... 33/355 R |
| 2005/0268477 A1 | * | 12/2005 | Chang ......................... 33/355 R |
| 2007/0137054 A1 | * | 6/2007 | Tsai ............................ 33/355 R |
| 2007/0220763 A1 | * | 9/2007 | Tsai ............................ 33/355 R |
| 2013/0014398 A1 | * | 1/2013 | Iden ............................ 33/355 R |

OTHER PUBLICATIONS

International Search Report for PCT/AU2011/000570, Completed by the Australian Patent Office on Jun. 15, 2011, 2 Pages.

* cited by examiner

*Primary Examiner* — G. Bradley Bennett
(74) *Attorney, Agent, or Firm* — Brooks Kushman P.C.

(57) ABSTRACT

A magnetic compass is provided which features a stationary central pointer which extends outwards to the inside of a rim displaying graduated angular indicia, said rim being integral with a pivoting disc which is magnetically coupled. The central pointer assumes the graphic shape of a craft, such as a ship's hull, the stationary disposition of which offers a more intuitive realization of the directional heading of a vessel with respect to the cardinal axes of a compass.

10 Claims, 2 Drawing Sheets

MAGNETIC COMPASS

CROSS-REFERENCE TO RELATED APPLICATION

This application is the U.S. national phase of PCT Appln. No. PCT/AU2011/000570 filed on May 16, 2011, which claims priority to Australian Patent Application No. 2010902089 filed on May 17, 2010, the disclosures of which are incorporated in their entirety by reference herein.

FIELD OF INVENTION

This invention relates to magnetic compasses for navigation purposes and more specifically to fluid-filled bowl compasses as used on ships and recreational vessels as a directional instrument.

BACKGROUND OF INVENTION

Magnetic compasses have been used by navigators for centuries, relying on the Earth's magnetic field to align a magnetized pivotable needle with the Earth's field to point to (magnetic) north. A variation on a needle is to have a centrally pivoted disc or card coupled to a magnet, a further variation is to immerse the disc in a transparent fluid to provide dampening. To minimize turbulence of the fluid around a disc and supports, the fluid is contained within a spherical transparent shell. As the vessel to be navigated is normally sea or air borne, then a compass therein must be able to accommodate rolling and pitching. This is achieved by a gimbal system that allows independent rotational movement in two horizontal axes.

The most common application of a magnetic compass is to ships and pleasure craft. These compasses are invariably of the type which are viewed from above, either directly or at an angle. It is to this compass type that the invention is directed.

There are several aspects of a conventional bowl compass that deserve attention, these include: the visual indicia to represent the orientation of a vessel relative to the compass; the viewing angle, the inertia of the compass card, the disposition of the magnetic elements to the pivot point; the means to accommodate expansion and contraction of an immersion fluid in response to temperature changes. In addition, conventional compasses are designed to be viewed from above or the side and a different design is necessary for a compass which is to be viewed from below. An ideal compass design would allow mounting in any orientation.

It has been found that hitherto each of these aspects exhibit shortcomings that compromise the performance of a compass. These are each discussed below.

The most important shortcoming is the interpretation by a viewer of the direction the craft is heading and the response necessary to maintain or align the craft to a new heading. Conventionally, a north-seeking magnet is secured under an opaque circular card on which is printed markings representing the 360 degrees of a circle and the cardinal points of a compass such as N, S, W and E. A reference or lubber line is fixed relative to the compass housing and is in close proximity to the outside of the card allowing readings to be taken of the direction of a vessel with respect to compass north.

The heading of a vessel to which a compass is installed is read with the aid of a reference line or lubber line close to the rim of the compass card. If the lubber line is positioned on the fore side of the compass such that when the N or 0 degrees mark is adjacent the lubber line, then the vessel is heading north. The shortcoming of this arrangement is that the corrective action to bring the vessel onto a course is not intuitive. For example if a northerly heading is desired and the lubber line indicates a heading of 020 degrees, the N direction on the card is anticlockwise of the lubber line and many helmsman especially novice ones are inclined to steer the vessel clockwise as if to bring the N mark over to the lubber line. This tendency arises because to an observer it seems that the compass card has moved or rotated, when in fact it has remained stationary and it is the orientation of the vessel that has changed.

If the lubber line is positioned on the aft side of the compass, the graduations on the card will 180 degrees displaced, N where S is and E where W is. The compass remains counter intuitive even though the lubber line is viewed ahead of the card. As in the example above, if the heading is 020 degrees, the north direction, which is 20 degrees to the left (port) will be shown 20 degrees to the right (starboard) of the lubber line.

The displacement of the lubber line from the card allows for parallax error to be present when not reading the compass from directly behind. Two observers side by side will read different headings to each other.

A different presentation of the indicia could offer a more intuitive recognition of corrections necessary to align a vessel to a specified heading. This aspect is the principal element of the invention and will be discussed further in a following section.

Additional aspects of compass design are relevant and are discussed herewith. The centre of the card has a pivot point about which the card rotates and can tilt a few degrees relative to a pivot support which is gimbal mounted allowing tilting freedom. The magnets are invariably secured below the pivot point so that the centre of mass of the card-magnet system is below the pivot point thereby keeping the card in a substantially horizontal plane.

A compass card and associated supports are housed in a spherical shell which is filled with transparent oil such as paraffin. This primarily dampens the movement of the card in response to vibrations and sharp movements. Since the compass will experience wide ranges of temperature, an elastic diaphragm is incorporated in a wall of the spherical chamber, said diaphragm accommodating any changes in fluid volume.

The compass card has hitherto been made as thin and as light-weight as possible. This feature has been to satisfy a recognized performance test which measures the time it takes for a card to redirect itself when misaligned for example by an external magnet. Clearly minimizing the angular inertia of the compass card better achieves the measure of the test, however it does not reflect the disturbances experienced in a real application. In practice, if the compass support is disturbed, this disturbance will be transferred through to the card via both pivot friction and fluid friction, for which a light-weight card will respond detrimentally.

The objective of this invention is to overcome the above shortcomings either individually or preferably—collectively.

DESCRIPTION OF INVENTION

The invention can be said to reside in a magnetic compass assembly which includes north seeking magnets coupled to a freely pivoting disc with a vertical rotational axis characterized by an outer rim of the disc displaying angular graduations and a rotationally fixed pointer located radially within the rim, said pointer being aligned parallel to the longitudinal axis of a craft in which the compass is mounted.

The invention can be further said to reside in a magnetic compass for navigational purposes characterised by a transparent compass card with a pair of rod-shaped magnets straddling the card's pivot in the same horizontal plane and the card being held in a horizontal plane either by an upward extending flotation arm or weight at the lower end of the rim or both. The compass card may be further characterized by a graduated cylindrical rim depending vertically downwards, said rim having evenly spaced vertical lines corresponding to angular separations. A pivot on which the compass card rests is integral to a transparent pivot support plate, said plate presenting an outline of a hull shape which is aligned to that of a vessel onto which the compass is mounted. The pivot support plate is mounted within a two-axis gimbal assembly that is supported within a transparent spherical housing comprising two hemispheres joined by a pair of annular members. For optimum viewing the compass is secured to provide viewing from 10° to 30° above or below the horizontal plane of the compass.

The invention can be better understood through a description of the invention with reference to the appended figures relating to a preferred embodiment in which.

DESCRIPTION OF PREFERRED EMBODIMENT

Figure 1:
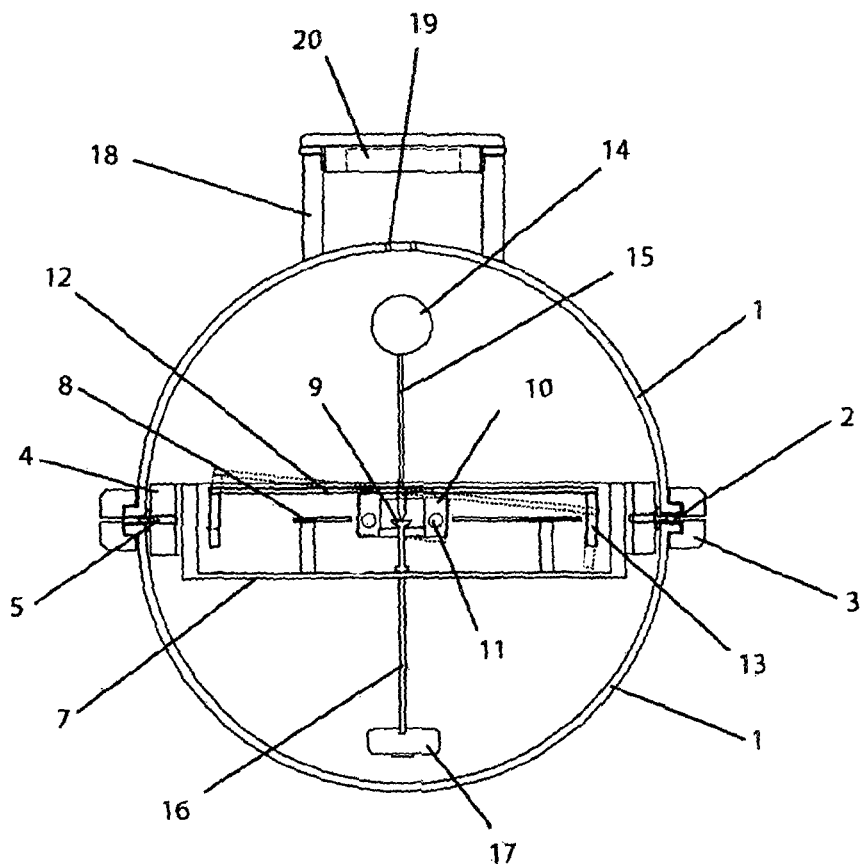
FIG. 1 represents a longitudinal cross-section of the compass, showing the main components.
Figure 2:
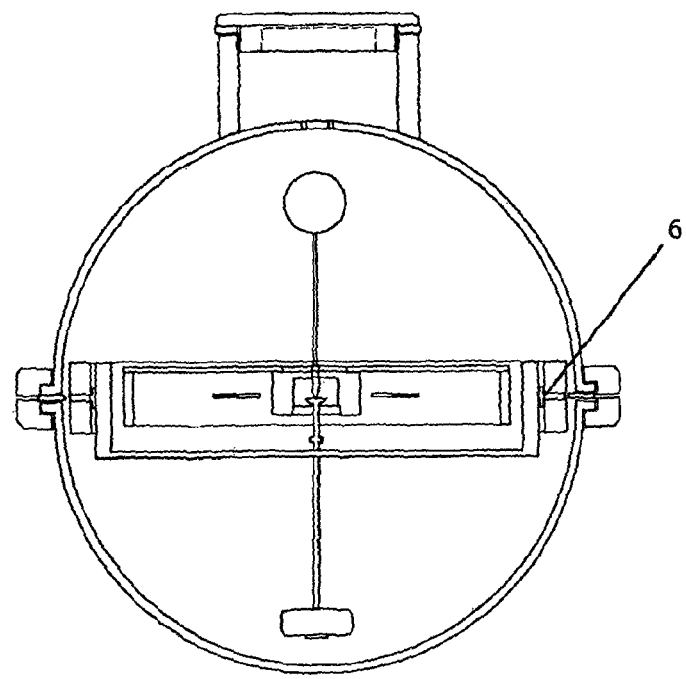
FIG. 2 represents a transverse cross-section of the compass, showing the main components.

Referring to FIGS. 1 and 2, two hemispherical domes 1 with a seal 2 therebetween are held together via upper and lower annular clamps 3 secured together by screws (not shown). A gimbal ring 4 pivots freely on a pair of pivot pins 5, while a second pair of pivot pins 6 shown in FIG. 2 and FIG. 3 oriented 90 degrees to the first pair of pivot pins supports a transparent plate 7. This plate supports via two or more posts on its upper horizontal surface a fixed pointer in the form of an opaque graphic 8 of a ship's hull with the axis corresponding to that of a vessel when mounted thereon. This plate 7 also supports a vertical pivot pin on which rests a cup 9 the combination of which acts as a bearing which is preferably a jewel bearing as commonly used with compass cards.

The cup 9 is accommodated within a hub 10 that houses two neodymium magnetic rods 11 which are preferably located in the same horizontal plane as the pivot point. Extending from the hub is a transparent pivoting disc 12, the periphery of which a cylindrical ring 13 depends downwards. This ring has graduations and numerals applied preferably to the inner surface, these graduations and numerals corresponding to the 360 degrees of a compass.

Additional angular markings may be included near the outer rim of the dish 12, so that the compass may be read when looked down on, from a steep angle nearer vertical, rather than at a shallow angle near horizontal for which the markings on the ring 13 presents a scale. In this preferred circumstance the indicia is magnified optically by the curvature of the bowl and the fluid therein.

In order to urge the card into a horizontal plane, either the lower rim of the cylindrical ring is weighted so the centre of gravity of the card assembly is below the pivot point or as shown in the figures, a float 14 is attached to a thin rod 15 which extends upwards from the hub 10. The buoyancy float can be made from a hollow plastic body or plastic foam of spherical or tabular shape. Such buoyancy feature also alleviates the loads on the bearings and pivots.

To assist in making the transparent plate 7 lie in a near horizontal plane, a thin rod 16 depends downwards on the end of which a small brass weight 17 is secured. Both the rods 15 and 16 may be used as sighting pins when taking a bearing of a distant object.

A fluid-filling and expansion chamber 18 is joined in a water-tight manner to the outside of the hemisphere 1 and communicates to the inside of the compass bowl via holes 19. A screw-top lid 20 allows filling of the compass bowl with fluid, normally a clear paraffin oil.

Figure 3:
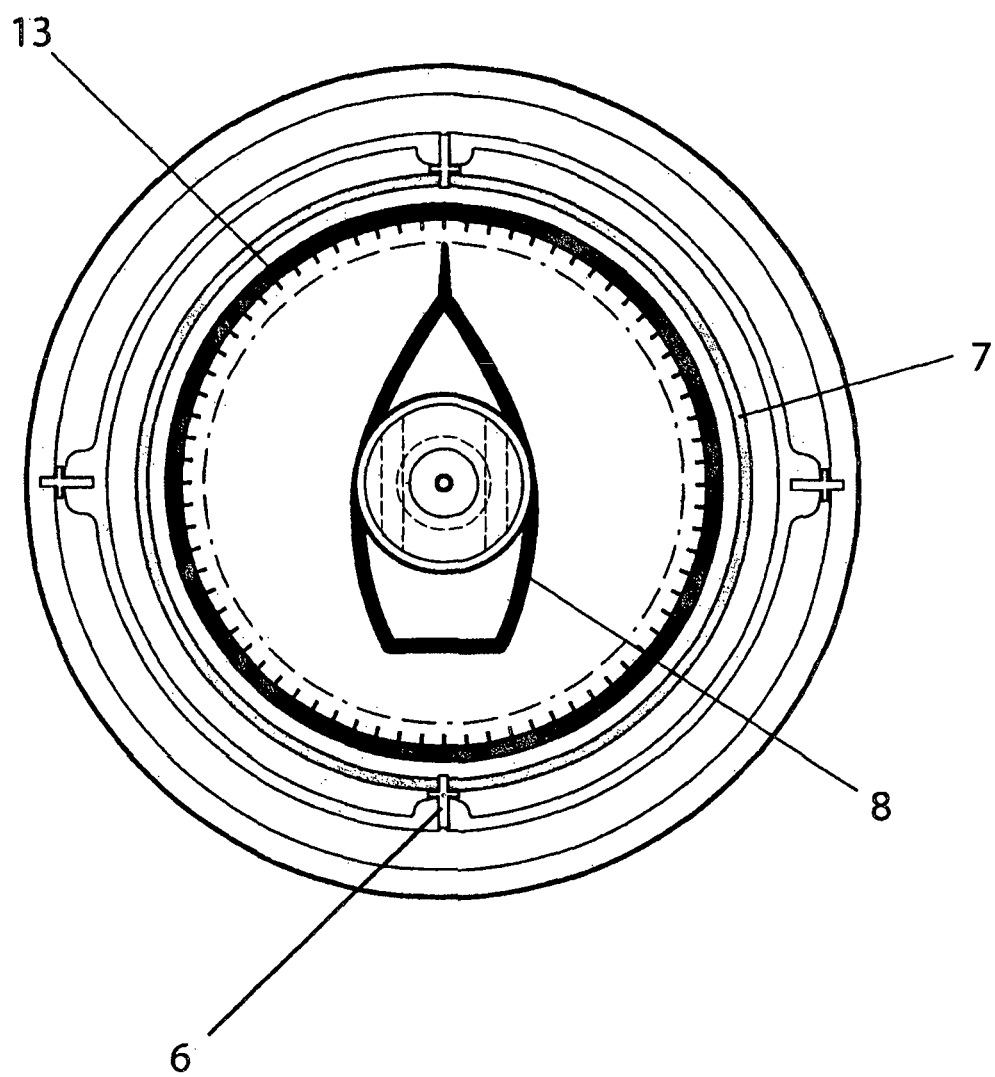
FIG. 3 shows a direction indicia on a cross-sectional plan view of the compass card support plate.

FIG. 3 shows a horizontal cross-section through the centre of the compass and shows a plate 7 which is pivoted on the gimbal ring 9. A graphic indicia 8 depicting the outline of a ship's hull is supported centrally on the plate 7. A bowsprit graphic from the bow of the indicia shape extends close to the compass card ring 13, said ring having graduations thereon representing directional angles. The graphic can be printed or be black vinyl adhered to transparent substrate which may extend beyond the borders of the graphic.

It will be recognized that the outline of the ship provides a better reference against which the outer moving directional graduations are observed, and that visualizing the direction of the vessel is more intuitive compared to the prior art in which the directional and swiveling graduations are inside a static reference line or lubber line.

To minimize the visibility of the components in the compass, where possible they are fabricated from transparent acrylic or other plastic which has a refractive index close to that of the fluid. Though preferably the gimbal ring that lies near horizontal is made white to enhance the visibility of the indicia on the compass card. It will be appreciated that the invention compass can be viewed from either above or below, that it can be inverted and it can also be mounted on a bulkhead where it is viewed side on.

The invention can also be applied to embodiments which are tailored specifically for viewing from above or below. In the instance where the compass is only to be viewed from below, then the graphic support plate is transparent and the disc which supports the graduated ring can be opaque, preferably white. Whereas in the instance where the compass is to be viewed from above, then the disc which supports the graduated ring can be transparent and the graphic support plate, opaque. Alternatively, where the gimbal system is external to a fluid-filled chamber housing a pivoted magnetic-coupled disc, then the graphic can be applied to an upper glass window which defines the upper portion of the housing.

Where reference has been made to a disc or plate then it will be understood that the disc or plate may feature cut-outs or spokes, though such features are not considered desirable for fluid-filled compasses.

The embodiment described represents one example of the invention, as anyone skilled in the engineering art will appreciated that numerous alternative designs can be effected which provide for an indicia of a hull or craft outline which is aligned with that longitudinal axis of a vessel, said indicia serving as a pointer or lubber line to a graduated rim which is magnetically orientated. Details of the construction will be rudimentary to those skilled in the art. Aspects such as mounting the compass assembly or illumination have been omitted as these do not constitute part of the invention.

The invention claimed is:
1. A magnetic compass assembly comprising:
a base having a mount for attachment to a craft;
a freely pivoting disc centrally mounted to the base for rotation about a vertical rotational axis, the disc having an outer rim comprising a shallow cylinder portion extending vertically upward or downward from the outer periphery of the disc with graduation markings formed on the inside surface of the disc, and a north seeking magnet attached to the disc remote from the disc center; and a pointer connected to the base located radially from the rotational axis and inboard from the cylinder rim in aligned with the craft longitudinal axis;

wherein, when viewed at a shallow angle relative to horizontal, a user can align the pointer with the graduation marking on the cylinder rim to obtain a compass heading.

2. The magnetic compass as in claim 1, wherein the base is transparent thereby enabling viewing from below a plane of the disc.

3. The magnetic compass as in claim 1, wherein the disc is transparent thereby allowing viewing from above a plane of the disc.

4. The magnetic compass as in claim 1, wherein the pointer is an opaque representation of the craft including an extension from the forward end of the representation, said extension terminating in close proximity to the graduated rim.

5. The magnetic compass as in claim 1, wherein both the pointer and a pin onto which the disc is pivoted are mounted on a base which is supported on a gimbal arrangement.

6. The magnetic compass as in claim 5, wherein the base comprises a transparent spherical chamber which is filled with a transparent oil and encloses the disc and pointer.

7. The magnetic compass as in claim 4, wherein the craft is a ship or boat and the pointer is an outline of a hull with a bowsprit representing the extension.

8. The magnetic compass as in claim 2, wherein an opaque sighting rod extends centrally downward from the base, thereby allowing azimuth bearings to be taken of distant objects.

9. The magnetic compass as in claim 6, wherein a buoyancy float is centrally attached above the disc on an opaque sighting rod thereby allowing azimuth readings to be taken of distant objects.

10. The magnetic compass as in claim 4, wherein both the pointer and a pin onto which the disc is pivoted are mounted on a base which is supported on a gimbal arrangement.

* * * * *